United States Patent [19]

Ali et al.

[11] Patent Number: 5,473,720

[45] Date of Patent: Dec. 5, 1995

[54] METHOD FOR ENHANCING THE PULLOUT STRENGTH OF POLYMER-COATED OPTICAL FIBER

[75] Inventors: Yussuf S. Ali, Fanwood; Darryl L. Brownlow, Bridgewater; Howard E. Katz, Summit; Valerie J. Kuck, Upper Montclair; Marcia L. Schilling, Basking Ridge; Lloyd Shepherd, Madison, all of N.J.

[73] Assignee: AT&T Corp., Murray Hill, N.J.

[21] Appl. No.: 207,528

[22] Filed: Mar. 7, 1994

Related U.S. Application Data

[63] Continuation-in-part of Ser. No. 98,972, Jul. 27, 1993, Pat. No. 5,345,528.

[51] Int. Cl.⁶ .............................. G02B 6/10; B05D 5/00
[52] U.S. Cl. .......................... 385/128; 385/100; 385/102; 385/123; 385/127; 385/141; 427/163.2
[58] Field of Search .................................... 385/141–145, 385/128, 123, 100, 102, 126, 127; 427/163.2

[56] References Cited

U.S. PATENT DOCUMENTS

| | | | |
|---|---|---|---|
| 34,005 | 7/1992 | Levinson et al. | 385/80 |
| 4,240,849 | 12/1980 | Kurokawa et al. | 156/73.2 |
| 5,062,685 | 11/1991 | Cain et al. | 385/114 X |
| 5,084,221 | 1/1992 | Matsuno et al. | 264/103 |
| 5,104,433 | 4/1992 | Chapin et al. | 65/3.1 |
| 5,136,682 | 8/1992 | Moyer et al. | 385/141 |
| 5,146,531 | 8/1991 | Shustack | 385/128 |
| 5,345,528 | 9/1994 | Katz et al. | 385/123 |

OTHER PUBLICATIONS

International Application WO91/03503 published under the Patent Cooperation Treaty on Mar. 21, 1991.

Primary Examiner—Brian Healy
Attorney, Agent, or Firm—Glen E. Books

[57] ABSTRACT

Applicants have discovered that low pullout strength of optical fiber is attributable to volatile, unreacted monomers and impurities which result from the incomplete polymerization of liquid coating materials. They have further discovered that removing these unreacted liquids as by heating in air, heating in vacuum or by application of a solvent mixture improves fiber coating adhesion. By heating cured polymer-coated fiber in air at temperatures of 100° C. or more, the fiber pullout strength is enhanced by 25% or more. This postcure heating can advantageously be clone off-line by placing loosely wound fiber in a heated oven. Alternatively, the postcure heating can be done on-line by reel-to-reel passage of the fiber through a heated furnace. Preferred temperatures are in the range 100° C.–300° C. Even greater enhancement of pullout strength can be effected by heating in vacuum or by solvent extraction.

6 Claims, 2 Drawing Sheets

METHOD FOR ENHANCING THE PULLOUT STRENGTH OF POLYMER-COATED OPTICAL FIBER

CROSS-REFERENCE TO RELATED APPLICATION

This application is a continuation-in-part of U.S. patent application Ser. No. 08/098972 entitled "Method of Enhancing the Pullout Strength of Polymer-coated Optical Fiber," filed Jul. 27, 1993 by H. E. Katz, V. J. Kuck and M. L. Schilling and assigned to applicants' assignee, now U.S. Pat. No. 5,345,528.

FIELD OF THE INVENTION

The present invention relates to methods for making optical fiber and, in particular, to a method for making polymer-coated optical fiber having enhanced pullout strength.

BACKGROUND OF THE INVENTION

Optical fibers are key components in modern telecommunications systems. Optical fibers are thin strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical optical fibers are made of high-purity silica with minor concentrations of dopants to control the index of refraction.

Commercial optical fibers are provided with polymer coatings to protect them from mechanical abrasion and stress. Typical polymers are urethane-acrylate coatings. The coatings are typically applied and cured with ultraviolet light as the fiber is drawn in a continuous process.

It is commercially desired that the polymer coating adhere to the fiber yet, when the need arises, permit visually clean stripping for splicing with other fibers and interconnecting with photonic devices. The accepted test of fiber-coating adhesion is the pullout test which measures the force needed to slide out one centimeter of fiber from its polymer coating.

SUMMARY OF THE INVENTION

Applicants have discovered that low pullout strength of optical fiber is attributable to volatile, unreacted monomers and impurities which result from the incomplete polymerization of liquid coating materials. They have further discovered that removing these unreacted liquids as by heating in air, heating in vacuum or by application of a solvent mixture improves fiber coating adhesion. By heating cured polymer-coated fiber in air at temperatures of 100° C. or more, the fiber pullout strength is enhanced by 25% or more. This postcure heating can advantageously be done off-line by placing loosely wound fiber in a heated oven. Alternatively, the postcure heating can be done on-line by reel-to-reel passage of the fiber through a heated furnace. Preferred temperatures are in the range 100° C.–300° C. Even greater enhancement of pullout strength can be effected by heating in vacuum or by solvent extraction.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for illustrating the concepts of the invention and, except for the graphs, are not to scale.

DETAILED DESCRIPTION

Figure 1:
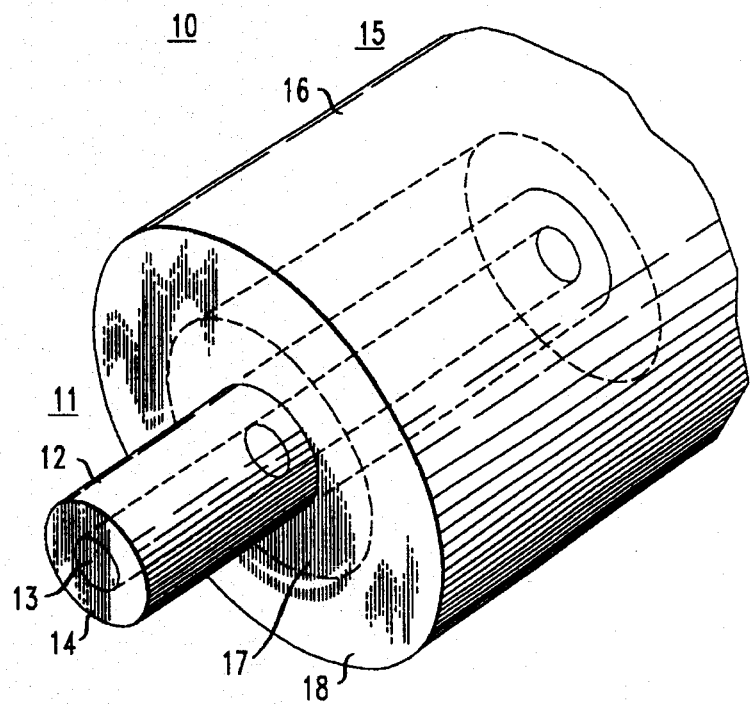
FIG. 1 is a schematic view of a typical cured, polymer-coated optical fiber which can be processed in accordance with the invention.

The first step in the inventive method is to provide a cured, polymer-coated optical fiber. FIG. 1 of the drawings is a schematic view of a typical coated fiber 10 shown with a stripped end 11 comprising a glass fiber 12 including a core region 13 surrounded by a cladding region 14. The fiber can be single mode or multimode optical fiber, but is preferably a single mode silica fiber having a core diameter on the order of a few micrometers and a surrounding cladding a few tens of micrometers thick. Desirably the outer surface of the stripped fiber 12 should be tree of visible polymer residues.

The unstripped fiber 15 comprises a cured polymer coating 16 which is preferably a dual coating comprising a primary (inner) coating 17 and a secondary (outer) coating 18. The polymer coatings can be any one of a variety of polymers including hydrocarbon polymers, polyethers, polycarbonates, polyesters and silicones. The primary coating is advantageously formulated to provide a soft, rubbery texture whereas the secondary coating advantageously has a more highly crosslinked, glassy texture. The polymers are preferably terminated by urethane-acrylates. Coatings comprising hydrocarbon polymers terminated with urethane acryltes are described in U.S. Pat. No. 5,146,531 entitled Ultraviolet Radiation Curable Coatings for Optical Fibers and Optical Fibers Coated Therewith issued to Paul J. Shustack on Sep. 8, 1992. Coatings comprising polycarbonate polymers terminated with urethane-acrylates are described in International Application WO91/03503 published under the Patent Cooperation Treaty on Mar. 21, 1991 and entitled "Primary Coating Composition for Optical Glass Fibers".

Cured, polymer-coated optical fibers are typically manufactured by constructing an optical fiber preform of desired composition, drawing fiber from the preform, and passing the fiber through baths of uncured polymer. The polymer is typically cured by exposure to ultraviolet radiation. Unfortunately, the pullout strength of such fiber is not sufficient to satisfy some customers.

Applicants have discovered that coated fibers contain volatile unreacted monomers and impurities which are believed due to incomplete polymerization of liquid coating materials. They have further found that removing these unreacted liquids leads to a marked increase in coating adhesion to silica fibers greater than 25%, typically producing a 100–200% improvement in adhesion. Three processes were discovered for removing the unreacted volatile materials from the coated fibers: heating in air, heating in vacuum and solvent extraction.

A convenient method for removing the volatile materials is off-line heating in a forced air oven. Table I below compares the pullout strengths of two dual-coated fibers, unheated and heated. The coatings designated type A are polycarbonate urethane-acrylates of the type described in WO91/03503, and the coatings designated type B are hydrocarbon urethane acrylates of the type described in the aforementioned Shustack patent. Loosely coiled fibers were heated at 140° C. in a forced-air oven for the times specified.

TABLE I

| | Pullout Force (lb/cm) | | |
|---|---|---|---|
| Coating | Unheated | Heated 10 min | Heated 100 min |
| Type A | 1.4 | 2.3 | 4.3 |
| Type B | 2.0 | 4.2 | — |

Figure 2:
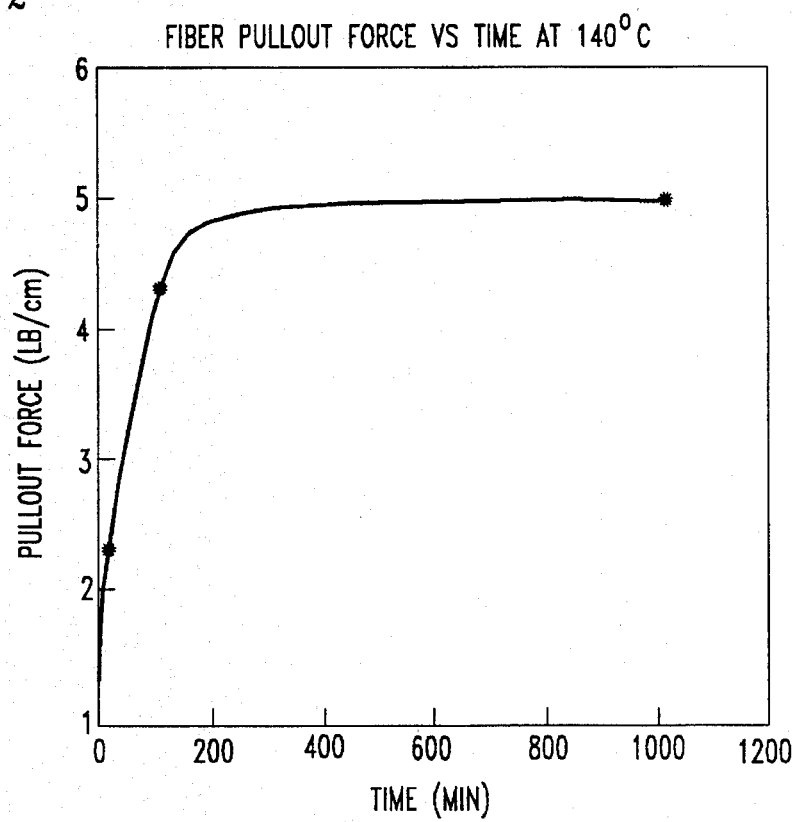
FIG. 2 is a graphical illustration showing the effect of off-line oven heating on the pullout strength of a typical fiber.

The degree of pullout strength enhancement at a given temperature is an increasing function of time. FIG. 2 is a plot of fiber pullout force versus time for a typical type A coated fiber heated at 140° C.

To determine the persistence of the heating-induced adhesion enhancement, pullout values for type B samples were measured after three days and after six weeks under 50% and 95% relative humidity. The fiber was heated for 10 minutes at 140° C. before aging. As shown in Table II, below, the improved adhesion observed after post-cure heating diminished only slightly under these conditions, indicating that the effect is not metastable and is not easily undone by absorbed water.

TABLE II

| | Pullout Force (lb/cm) | |
|---|---|---|
| Aging Conditions | Unheated | Heated |
| 1 hour after draw, 50% RH | 1.6 | 3.3 |
| 3 days after draw, 50% RH | 1.6 | 2.8 |
| 3 days after draw, 95% RH | 1.7 | 2.9 |
| 6 weeks after draw, 50% RH | 1.8 | 2.9 |
| 6 weeks after draw, 95% RH | 2.1 | 2.7 |

Alternatively, postcure heating can be on-line heating by passing the cured polymer-coated fiber reel-to-reel through a quartz lined furnace. Table III below compares the pullout strengths of unheated fiber and fiber passing through a 260° furnace. Specifically, a type A coated fiber aged six months at 23° C. in 50% relative humidity was passed at constant velocity from a reel through a 40 cm tube furnace lined with a 48 mm inner diameter quartz tube. The heated fiber was cooled in a stream of nitrogen and taken up on a second reel.

TABLE III

| Condition | Pullout Force (lb/cm) |
|---|---|
| Unheated | 2.3 |
| 2.4s, 260° C. | 2.5 |
| 4.8s, 260° C. | 2.7 |
| 7.2s, 260° C. | 2.9 |
| 13s, 260° C. | failure |

Since typical polymers decompose at temperatures above about 300° C., heating at temperatures greater than 300° C. is believed inadvisable and can lead to a discolored and weakened polymer.

Thus, the cured polymer coated fiber should be heated at a temperature between 100° C. and 300° C. for a time sufficient to increase its pullout strength by at least 25%. The time required depends on the temperature: at 100° C., about 5 hours are required; at 140° C., about 50 minutes; and at 260° C., about 7 s. More generally, pullout strength versus heating time was found to fit the relation $P(t)=P_o+\Delta P(1-e^{-t/\tau})$ where $P(t)$ is the pullout strength after heating for a time t, $P_o$ is the pullout value before heating, $\Delta P$ is the maximum observable increment in P and $\tau$ is an empirically determinable time constant.

Figure 3:
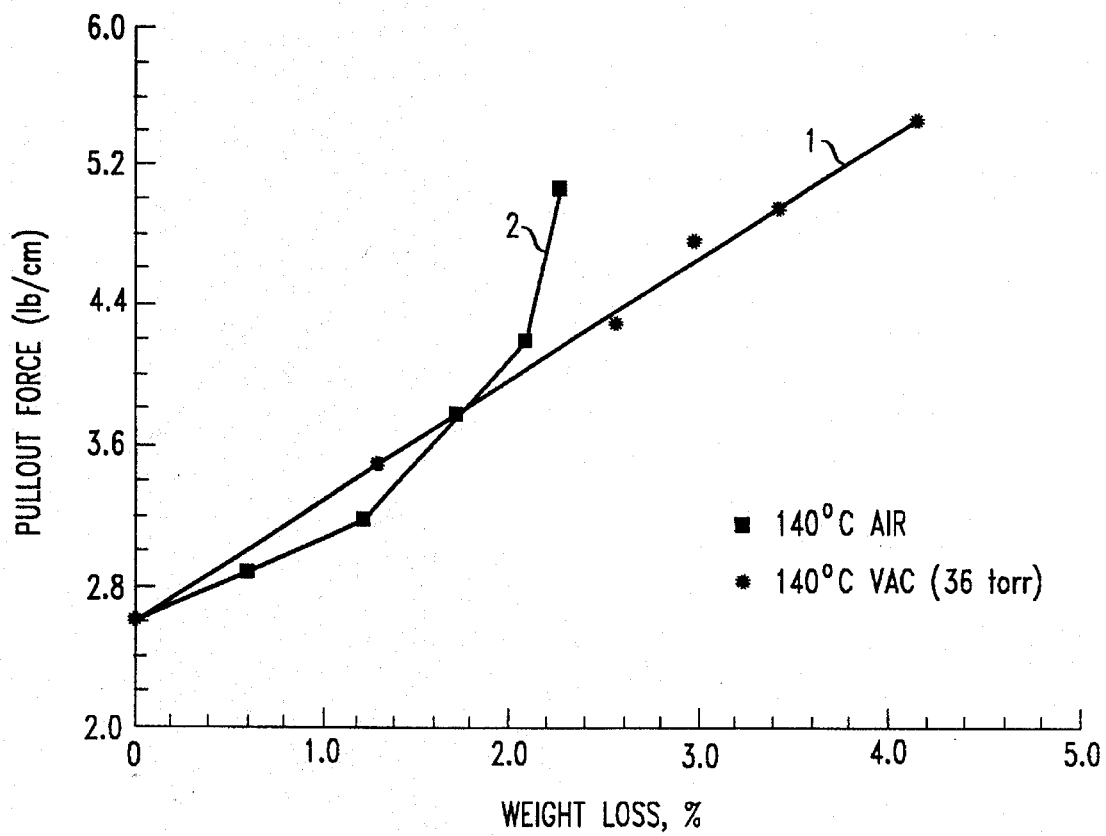
FIG. 3 is a graphical illustration showing pullout force versus weight loss for typical coated fibers.

Even greater enhancements to pullout strength can be achieved by heating in a reduced pressure ambient. For example, type A coated fibers were heated at 140° C. in a reduced pressure environment (36 torr) and pullout strength and weight loss were measured at intervals of 10, 20, 30, and 60 min. Curve 1 of FIG. 3 shows the pullout strength as a function of weight loss. As shown in FIG. 3 the enhancement of pullout strength is directly proportional to the weight loss, and enhancement of pullout strength by 25% corresponds to removal of volatiles constituting about 1% of the sample weight. Curve 2 of FIG. 3 shows a similar plot for the same kind of fiber heated in air at 140° C. Reduced pressure heating obtained greater enhancement of pullout strength in shorter time.

The results of this testing and similar testing at 185° C. and 100° C. are summarized in Table IV:

TABLE IV

Physical Data from Devolatization Processing of Type A Coated Optical Fiber

| Thermal Processing | Temperature (°C.) | Time (min) | Weight Loss (coating, %) | Pullout Force (POF) (lb/cm) | ΔPOF (lb/cm) |
|---|---|---|---|---|---|
| None | — | — | — | 2.6 | — |
| Air | 140 | 10 | 1.20 | 3.2 | 0.6 |
| Vacuum | 140 | 10 | 2.55 | 4.3 | 1.7 |
| Air | 140 | 20 | 1.91 | 3.8 | 1.2 |
| Vacuum | 140 | 20 | 2.95 | 4.8 | 2.2 |
| Air | 140 | 30 | 2.06 | — | — |
| Vacuum | 140 | 30 | 3.41 | — | — |
| Air | 140 | 60 | 2.27 | 5.1 | 2.5 |
| Vacuum | 140 | 60 | 4.13 | 5.5 | 2.9 |
| Air | 140 | 120 | — | 5.8 | 3.2 |
| Vacuum | 140 | 120 | — | 6.0 | 3.4 |
| Air | 185 | 3 | 1.76 | — | — |
| Air | 185 | 5 | 2.11 | 5.1 | 2.5 |
| Vacuum | 185 | 5 | 3.54 | 5.9 | 3.3 |
| Air | 185 | 10 | 2.44 | 5.8 | 3.2 |
| Vacuum | 185 | 10 | 4.74 | 6.8 | 4.2 |
| Air | 100 | 480 | — | 4.2 | 1.6 |
| Vacuum | 100 | 480 | — | 5.2 | 2.6 |
| Vacuum | 100 | 60 | 1.86 | 3.2 | 0.6 |
| Vacuum[a] | 100 | 60 | 6.02 | 5.7 | 3.1 |

[a]Pre-extracted 17 h in isopropanol/dichloromethane (80/20, w/w).

In general, the lower the ambient pressure, the more rapidly volatile materials will be removed. Yet another method for removing volatile materials is solvent extraction. In essence a solvent, such as isopropanol/dichloromethane is applied to the coated fiber to swell the fiber coating and extract the volatile residues. The solvent is then evaporated as by the application of low temperature heat. As an example, a type A coated fiber was subjected to 80/20 (by weight) isopropanol/dichloromethane for 7 hours at 23° C. and then heated 60 minutes at 100° C. in a 36 torr ambient. As shown in Table V, the pullout strength was enhanced as compared with untreated fiber heated in vacuum without extraction.

TABLE V

Effect of Solvent Extraction Processing on Pullout Force of Type A Coated Optical Fiber

| Processing | Pullout Force [POF] (lb/cm) | ΔPOF (lb/cm) |
|---|---|---|
| none (as received) | 2.6 | — |
| Heated, 60 min at 100° C. in vacuum[b] | 3.2 | 0.6 |
| Solvent extracted[a], heated, 60 min at 100° C. in vacuum[b] | 5.7 | 3.1 |

[a]17 h extraction in isopropanol/dichloromethane, 80/20 w:w at 23° C. 6.0 wt. % of the coating was removed upon extraction processing.
[b]36 Torr pressure, in vacuum oven.

It is contemplated that in commercial applications, a supercritical fluid, such as supercritical carbon dioxide, would be used as the solvent.

We claim:

1. A method for enhancing the pullout strength of polymer-coated optical fiber comprising the steps of:

providing a cured, polymer-coated optical fiber; and removing from said fiber volatile material in an amount exceeding at least 1% of the weight of said fiber.

2. The method of claim 1 wherein said volatile material is removed by heating said fiber in a reduced pressure environment.

3. The method of claim 1 wherein said volatile material is removed by solvent extraction.

4. The method of claim 3 including the step of heating said fiber after subjecting it to solvent.

5. The method of claim 3 wherein said solvent extraction comprises exposing said coated fiber to a supercritical fluid solvent.

6. The method of claim 5 wherein said supercritical fluid solvent comprises supercritical carbon dioxide.

* * * * *